Nov. 18, 1941.  A. BOYNTON  2,262,750
FLOW INTERMITTER
Filed Nov. 28, 1938  5 Sheets-Sheet 1

ALEXANDER BOYNTON, INVENTOR,
BY Jesse R. Stone
Lester D. Clark
ATTORNEYS.

Nov. 18, 1941.  A. BOYNTON  2,262,750
FLOW INTERMITTER
Filed Nov. 28, 1938  5 Sheets-Sheet 3

ALEXANDER BOYNTON,
INVENTOR,
BY Jesse R. Stone
Lester D. Clark
ATTORNEYS.

Patented Nov. 18, 1941

2,262,750

UNITED STATES PATENT OFFICE 2,262,750

FLOW INTERMITTER

Alexander Boynton, San Antonio, Tex.

Application November 28, 1938, Serial No. 242,774

14 Claims. (Cl. 166—2)

My invention relates to flowing liquids from wells, particularly oil from deep wells, by means of intermittent flow, using compressed air or gas as the lifting force. The flowing operation coincides with the existence of a relatively high air or gas pressure within the well casing exterior of the eduction tube, hereinafter referred to as the flow tubing; and the intermission coincides with the existence there of a relatively low air or gas pressure.

The invention may be used with or without flowing, or aerating, devices spaced at intervals in the flow tubing to enable the use of pressure fluid (compressed air or gas) as a lifting force, as the particular well condition may require.

Some wells, herein termed "high pressure wells," will yield their production satisfactorily if air or gas at high pressure is applied above the liquid in the annular space between the well casing and the flow tubing. Other wells, herein termed "low pressure wells," will not yield satisfactory production if flowed by compressed air or gas unless the same is prevented from exerting its force upon the producing formations of the wells. In such a well, a string of pressure tubing having the flow tubing within it and a bottom seal between them may be employed to contain the pressure fluid, and thus prevent it from retarding inflow of well liquid. Such installations are shown in my Patents Nos. 1,968,633, 2,006,909, 2,010,135, 2,042,583.

This invention will function equally well whether the pressure fluid to operate it comes from the annular space between the well casing and the flow tubing, as in high pressure wells, or from the annular space between the pressure tubing and the flow tubing, as in low pressure wells.

This specification will describe and the drawings will illustrate the device as installed upon a high pressure well employing pressure fluid from the annular space between the well casing and the flow tubing to operate the same in conjunction with a low pressure receiver. It is understood that the installation may be also made upon low pressure wells by using pressure fluid to operate the device from the annular space between the pressure tubing and the flow tubing by a regulator to control the pressure introduced.

There is a so called "critical point" in the pressure, that is, the pressure at which a well will yield its production by use of the least amount of pressure fluid. This relation between the amount of well liquid produced and the amount of gas used to produce it is commonly referred to as the "gas-oil ratio." This device may be adjusted to open at any pressure and to close at any lesser pressure, allowing some difference, of course, for friction which in this mechanism is slight.

One of the objects of this invention is to provide automatic means for flowing oil wells at as near as possible to the critical point, as defined in the preceding paragraph. If, for example, the critical point is 300 pounds, this device may be set to open the valve in the flow tubing to initiate flow at 320 pounds, and to close at 280 pounds—20 pounds on either side of the critical point.

Another object is to provide means for recording the number of flowing operations within a certain time, in conjunction with the previously stated purpose, in order to avoid the almost constant attention of an attendant to determine the performance of a well as heretofore required. For this purpose I attach a pawl to the piston that operates the valve to turn a ratchet a certain distance on each stroke, which causes numbers to appear opposite a pointer that indicates the number of each flowing operation.

A further object of the invention is to regulate the pressure at which gas wells or storage reservoirs of gas or liquids can be made to discharge gas or liquids into a line or other receptacle at a predetermined relatively low pressure existing in the line or receptacle, and to cut off the discharge into same at a relatively high pressure obtaining therein by slightly changing the installation plan as will be later explained.

Another object is to close valves on burst pipe lines to prevent waste through the break.

Other objects of this invention are to provide means to propel a solid or liquid body of material by intermittently discharging high pressure air or other fluid substance behind them.

In accomplishing one of the foregoing objects, a cased well, having a flow tubing extending to proximate the bottom thereof and with a hermetic seal provided between them proximate the ground surface, has a valve in the flow tubing above the casing head with a lever or handle to operate the valve connected to a piston. The piston is driven in one direction by pressure fluid of a relatively high value from the annular space between the well casing and flow tubing to open the valve. The valve is subsequently closed by the piston traveling in the opposite direction, impelled by pressure fluid of a predetermined lesser value from a reservoir usually called a "receiver," this return of the piston being accomplished after the high pressure which first actuated the piston from the other end has dropped somewhat below the pressure used to return it.

In order to provide the pressure fluid of a lesser value to close the valve than that used to open it, I install a pressure regulator in a line communicating between the pressure fluid in the well and the reservoir or receiver. When the pressure fluid value builds up in the well (whether it be gas from the well itself or from an outside source) to a predetermined pressure, the regulator closes the path between the well and the receiver.

This pressure is held in the receiver until the pressure in the well becomes spent, in the flowing operation, down to a predetermined lesser value than that obtaining in the receiver. The pressure fluid in the receiver then returns the piston and closes the valve.

Many other uses than herein enumerated can be made of this invention without requiring inventive skill to apply it, as will be more apparent from an examination of the accompanying drawings in which:

Fig. 18 is a transverse section on the line 18—18, Fig. 9.

Figs. 21, 21A and 21B are side, top, and edge views respectively of the bumper washer 94 in Fig. 17.

Identical characters of reference refer to similar or identical parts throughout the several views.

Figure 7:
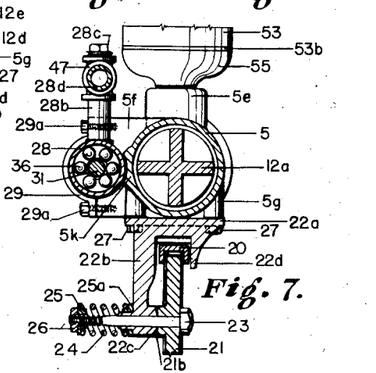
Fig. 7 is a transverse section on the line 7—7, Fig. 3.
Figure 8:
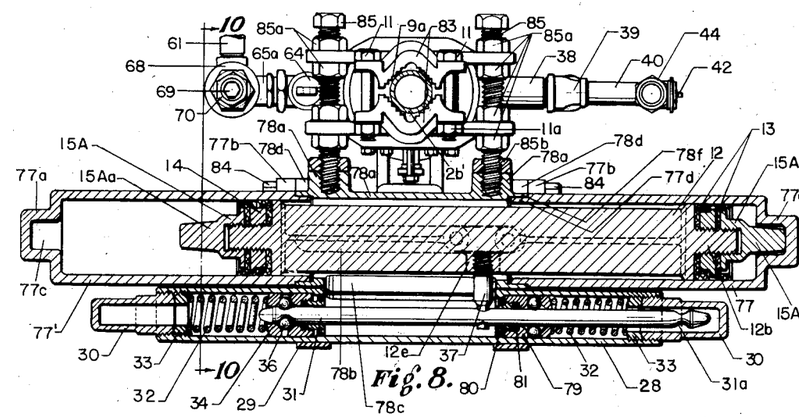
Fig. 8 is a longitudinal section of a modified form of the device taken on the line 8—8, Fig. 10, and part of the section on the line 8—8, Fig. 9.
Figures 9, 10:
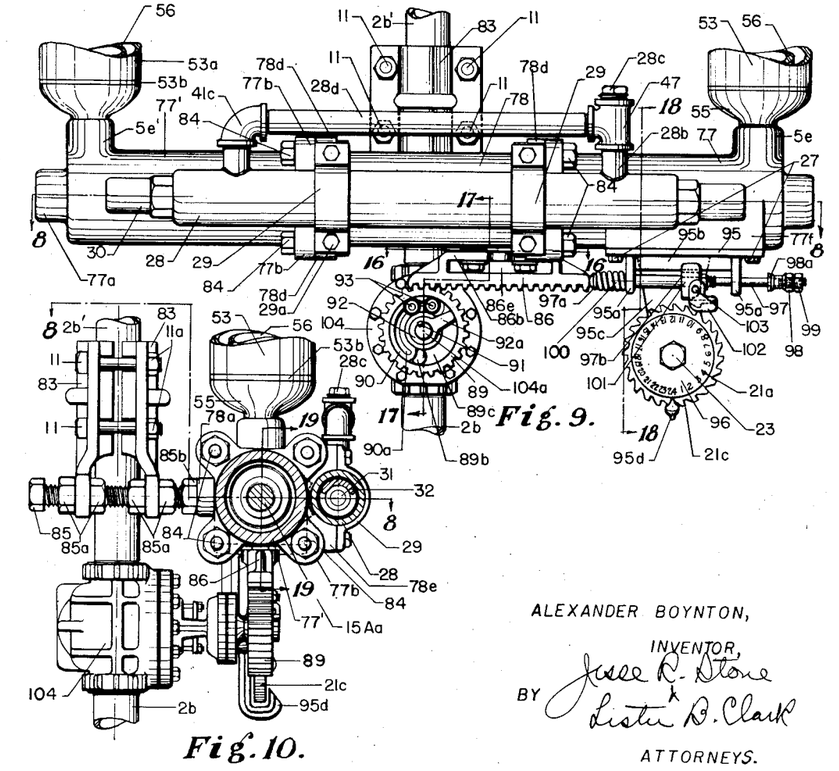
Fig. 9 is an outside front elevation of part of this modified form of the invention.
Fig. 10 is a transverse section on the line 10—10, Fig. 8.

The first form of the invention shown in Figs. 1 to 7 inclusive, adapted to one type of valve, and the second form shown mainly in Figs. 8, 9, and 10, adapted to another type of valve, are equally preferred.

Figure 2:
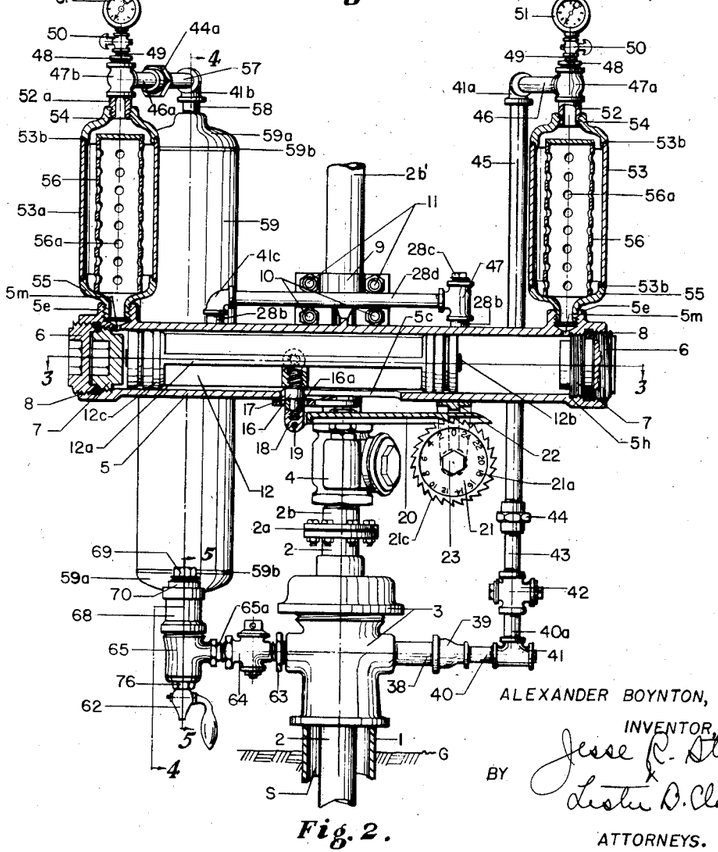
Fig. 2 is a partial longitudinal section through part of the device on the line 2—2, Fig. 1, the remainder being shown in elevation.

In Fig. 2, which shows the first form of the invention installed upon a well, casing head 3 forms a hermetic seal between well casing 1 and flow tubing 2 proximate the ground surface G. The tubing, extending downward into the well liquid and upward of the casing head, is joined by union 2a to nipple 2b having threaded engagement with valve 4, the upper end of which has similar engagement with nipple 2b'. Clamps 9 having teeth 9a are secured upon nipple 2b' by bolts 10, nuts 10a and by bolts 11 and nuts 11a. The bolts 10 are long enough to support a cylinder 5 by means of nuts 10b engaging with a bracket 5a reinforced by the brace rib 5b.

Within the cylinder 5, preferably a casting, piston heads 12c of piston 12 (Fig. 3), also preferably a casting, have a close sliding fit. Cups 13, which may be of leather or other pliable material and having a snug movable fit within the cylinder, are spaced apart by cup spacers 14 and secured upon extensions 12b by cup clamp nuts 15. The ribs 12a are of somewhat less diameter than the heads 12c in order that the central portion of the cylinder 5 need not be finished as is required for the ends within which the heads and cups travel. Equidistant from either end of the piston, one of the ribs is enlarged into a boss 12d (Fig. 4), within which is engaged valve arm drive pin 16 (Fig. 2), over a portion of which bearing rings 16a is held in position to register with the slot 17a (Fig. 3) of valve arm 17 by hinge cap 18. Slot 5c in the cylinder provides that drive pin 16 may have free longitudinal movement therein for the full length of the piston travel, but the diameter of the slot is only a few thousandths of an inch greater than the diameter of the portion of pin 16 which is slidable within it. This slight clearance of the drive pin within the cylinder slot prevents any appreciable rotary movement of the piston. The valve arm 17 is secured upon square valve shank 4a by nut 4c engaged upon threaded extension 4b, thus providing that the valve 4 will be opened by the horizontal arcuate swing of arm 17 in one direction, and closed by such movement in the opposite direction. The bearing ring 16a (Fig. 2) is freely rotatable upon drive pin 16 and is free to roll upon the surface of slot 17a in order to minimize friction when the valve is actuated as will be later explained.

It will be noted that clamps 9 may be placed upon nipple 2b' so as to cause drive pin 16 to exactly position the bearing ring 16a vertically within the slot 17a, and that bolts 9 are of such length that nuts 10b (Fig. 1) can be run inward or outward to position the cylinder 5 and its piston 12 horizontally so that the drive pin may be positioned to travel far enough within the slot 17a to valve arm 17 to open and close the valve 4. The slot is of such length as to accommodate necessary travel therein of bearing ring 16a for the full length of the piston stroke employed to actuate the valve. Such provision for moving the clamps upward or downward, and of moving the cylinder inward or outward, enables the use of any desired size of flow tubing and any corresponding size of valve in same. This provision also allows that valves of different makes, requiring different length of stroke to operate them, may be used without necessitating any change in the construction shown. The arcuate travel of valve arm 17 will be increased by moving the cylinder toward nipple 2b', and such travel will be decreased by moving the cylinder away from that nipple as is obvious.

It will be noted that each end of the cylinder 5 is hermetically closed by plugs 6 and 7. Plug 7 lands upon shoulder 5h in order to provide for an exact length of piston travel, which travel remains constant. Plug 6 engages upon packing 8 which is provided to make certain that the cylinder ends will be hermetically sealed, both plugs 6 and 7 being formed with wrench holes as shown.

One of the piston ribs, at a point equidistant from the ends of the piston and at 90° around the piston from the position of valve arm drive pin 16, is formed into a boss 12e into which is secured latch drive pin 37 of slightly less diameter than the slot 5d in cylinder 5 and the registering slot 28a in latch housing 28. Both of said slots are of such length as will allow longitudinal movement of the latch pin the full distance of the piston travel as is allowed for valve arm drive pin 16.

Latch housing 28 contains the latching mechanism in which latch shaft 31, having a transverse drilled passage equidistant from either end to closely receive the end of latch pin 37, has a free working fit through ball riders 34, ball floors 35, and ball floor base rings 35a, the latter of which, for exactness of position, land upon the shoulders 28f (Figs. 3 and 15) so located as to position rings 35a to stop and support ball floors 35 in such position that the turned down portions 31a of shaft 31 will alternately engage the latch balls 36 at each end of the piston travel. Springs 32, always installed under some compression, hold ball riders 34 resiliently engaged upon latch balls 36. Compression of each spring is controlled by latch housing plugs 30 which in turn serve to give position to latch spring compression rings 33, which rings are freely movable within the threads and bore of housing 28.

The circular arcuate surfaces of ball riders 34 and ball floors 35 are formed as shown for the obvious purpose of causing the latch balls to engage upon the portion of reduced diameter 31a of shaft 31 with a predetermined force at any given compression of springs 32. The balls must be of such diameter that they will neither become impinged by the shaft 31 upon housing member 28 nor impinge upon themselves before engaging the portion of reduced diameter 31a of the shaft.

Figure 3:
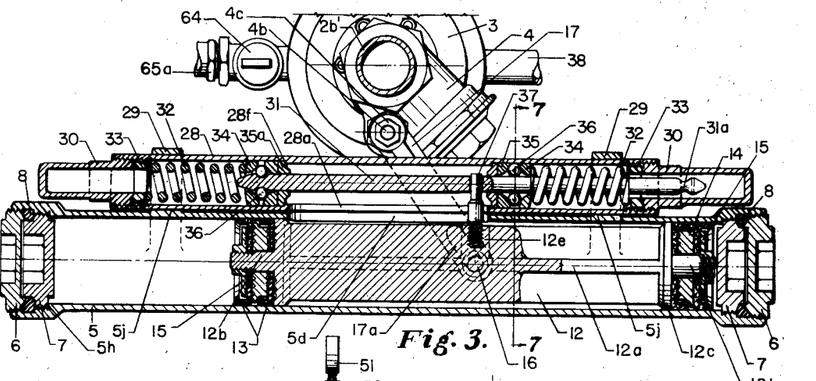
Fig. 3 is mainly a longitudinal section through the center of the cylinder and latch on line 3—3, Fig. 2.

The latch housing 28 is received within the longitudinal ribs 5k (Fig. 7) and is held with the slots 5d and 28a in registration by latch housing clamps 29 secured by cap screws 29a engaged upon latch housing support ribs 5f. It will be noted that there is slight clearance allowed between the housing 28 and ribs 5k (Fig. 7) in order that the clamps 29 will not bend latch housing 28 and thereby impair the free action of the latch if, through imperfect workmanship, the ribs 5k should be too high at any place between the clamps. This clearance is provided by the slight pad or raised portion 5j (Fig. 3).

Figure 1:
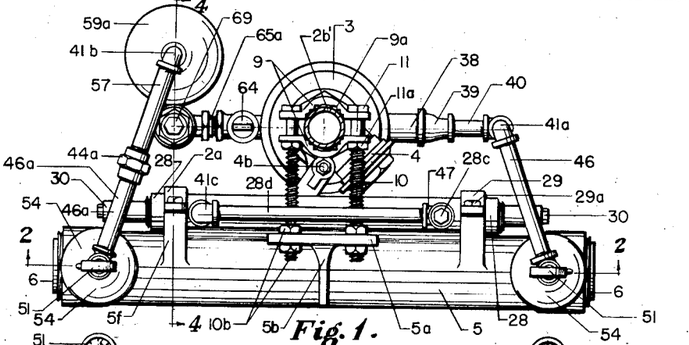
Fig. 1 is a top plan view of the device.

Nipples 28b, welded over openings in housing 28 and joined together at their upper ends by nipple 28d, and elbow 41c, and T 47 provide a reservoir for a lubricant for the latch assembly, which lubricant may be supplied by removing plug 28c. The lubricant is held from escaping through slot 28a and the slight clearance between latch housing 28 and ribs 5k by packing, cement, or paint. Nipples 22b and 28d installed as shown in Figs. 1, 2 and 9, also provide that the latch lubricant may move from one end of the housing 28 to the other end thereof as the latch operates, thus preventing the latch shaft from becoming impinged upon the lubricant.

The force with which the latch resiliently holds the piston 12 at either end of its travel is adjusted by varying the compression force of springs 32. Increasing this force by inwardly screwing plugs 30, increases the holding grip of the latch balls and vice versa. This grip should be such as will cause the piston to quickly complete movement begun in either direction of its travel.

Figure 4:
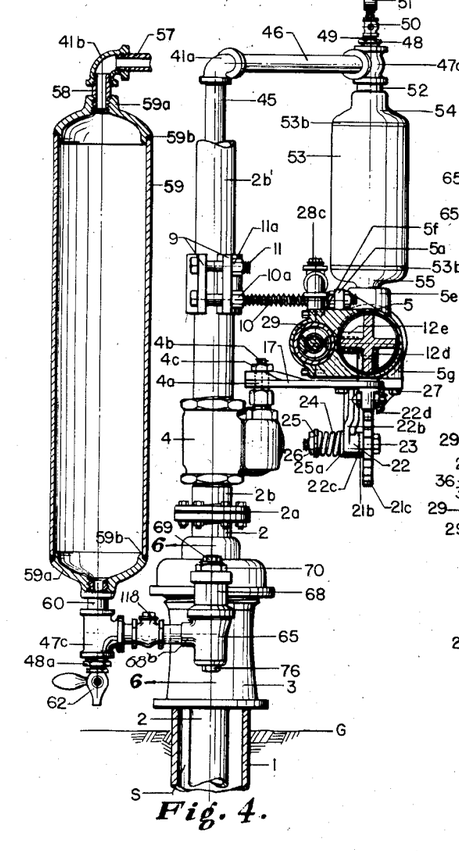
Fig. 4 is a transverse section on the line 4—4, Figs. 1 and 2.
Figure 5:
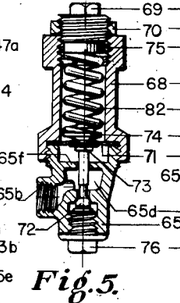
Fig. 5 is a longitudinal section on the line 5—5, Fig. 2.
Figure 6:
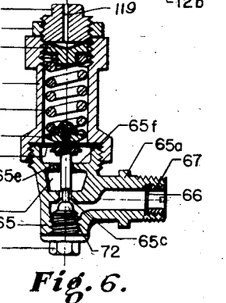
Fig. 6 is a longitudinal section on the line 6—6, Fig. 4.

Counter support bracket 22 has its base plate 22a secured upon ribs 5g of cylinder 5 by cap screws 27 (Figs. 4 and 7). Extension 22b, having ratchet hub teeth 22c engaged with ratchet hub teeth 21b of counter ratchet wheel 21, are placed in registration by axle bolt 23 and held resiliently together by spring 24, seating upon washers 25 and 25a. Nut 26 provides means for adjusting the spring compression to cause positive engagement between the opposing ratchet hubs. The counter pawl 20, hinged upon cap 18 by pin 19 (Fig. 2), rests upon the top of ratchet wheel 21 in such manner as to engage peripheral teeth 21c and rotate the wheel 21 far enough to move the engaged teeth 21b and 22c one step forward at each valve closing moment of the piston 12. On the return trip of the pawl as the piston moves in the opposite direction to open valve 4, the pawl rides free over teeth 21c which are held against rotation in the opposite direction by the teeth 21b and 22c. The pawl 20 is held in alignment with wheel 21 by extensions 22b and 22d as appears in Fig. 7, the lower end of extension 22d being formed into a pointer that registers with the numbers 21a. The ratchet wheel and pawl thus provide that the number of each flowing operation will be recorded in sequence as each operation is completed.

The pressure regulator base 65, having internally threaded boss 65b and externally threaded boss 65a, is threadedly joined to spring housing 68, an internal shoulder of which latter member engages diaphragm 71 in leakproof contact with the upper end of base 65. An opening central of the diaphragm snugly receives the upper stem of valve 72 which is held in hermetically sealed engagement with the diaphragm by lock ring 74 having threaded engagement with the valve stem and impinging the diaphragm upon grip ring 73. The upper end of lock ring 74 is formed to snugly receive the support spring 82 within housing 68.

Spring compression washer 75, having slight clearance within housing 68, engages the upper end of the spring and plug 69 which may be screwed upward or downward to adjust the spring compression, lock ring 70 serving to secure such adjustment. Valve 72, having a seat 65c, is normally held away from said seat by the force of spring 82. The stem of valve 72 has a free sliding fit within the plate section 65f. This fit serves to guide the valve to truly engage upon its seat. The valve stem, immediately above valve 72, has a portion of reduced diameter to allow for free passage of pressure fluid when the valve is not engaged upon seat 65c as appears in Figs. 5 and 6. An opening 65e through plate section 65f provides that pressure fluid may pass out of chamber 65d and contact the diaphragm at all times when valve 72 is not seated. Plug 76 provides a landing for valve 72 when the valve is open in order to relieve the diaphragm of unnecessary strain from the spring thrust. Screen 66, having a peripheral landing upon a shoulder within extensions 65a, is secured in place by lock ring 67. The plug 69 may be loosely threaded into the housing 68 or a vent may be provided to prevent pressure building up above the diaphragm 71 in event of leakage past the diaphragm.

Valve 72, normally held open by spring 82, will be seated by a predetermined pressure fluid force exerted upon the lower side of diaphragm 71. Increasing the compression of the spring will increase the force required to close the valve, and vice versa, as is apparent. Screen 66, obviously, serves to keep the valve and valve seat clean of solid particles coming from the well.

Nipple 28 threadedly joined within an opening in the casing head communicating with the annular space S and to reducer 39, together with nipple 40, T 41, nipple 40a, stop cock 42, nipple 43, union 44, nipple 45, elbow 41a, nipple 46, T 47a, nipple 52, and lubricator 53, threadedly joined to boss 5e, form means for pressure fluid communication between the high pressure end of the cylinder and the annular space S.

Bushing 63, threadedly joined to the casing head, combustion check valve and stop cock 64, regulator base 65, nipple 61, T 47c, nipple 60, receiver 59, nipple 58, T 41b, nipple 57, union 44a, nipple 46a, T 47b, nipple 52a and lubricator 53a, all threadedly joined together and similarly connected to boss 5e', provide means for pressure fluid communication between the low pressure end of the cylinder 5 and the annular space S. Drain cock 62 connected beneath T 47c by bushing 48a provides means for draining liquid condensation from the receiver 59.

Within the lubricators 53 and 53a respectively reside the baffle tubes 56, being open at their lower ends and closed at their upper ends and each having lateral perforations 56a. Lubricators 53 and 53a are filled with a lubricant which provides lubrication for the pistons. The lubricant is drawn into the cylinder as the piston moves away from either end and is forced back into the lubricator as the piston approaches either end.

Figure 11:
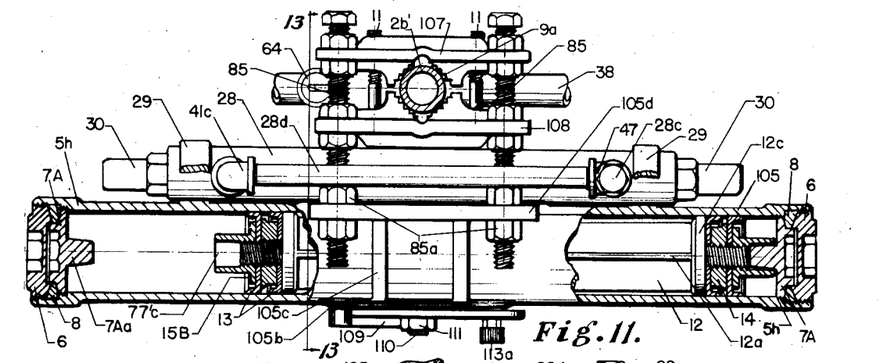
Fig. 11 is partially a plan view and partially a longitudinal section of the second modified form of the invention.

The openings 5m (Fig. 2) communicating between the lubricators and the cylinders may be small, such as $\frac{1}{2}''$ diameter for a $4''$ diameter piston, in order to avoid piston slam in both directions unless a dashpot is employed for this purpose as in Figs. 8 and 11. Lubricator ends 54 and 55 may be welded upon lubricators 53 and 53a as shown at 53b. Likewise the ends 59a may be welded upon the receiver 59 as shown at 59b.

In Fig. 3, which shows the piston at one end of its stroke, it will be observed that the piston end extension 12b has very slight clearance, such as $\frac{1}{32}''$, with plug 7, while at the same time the latch balls 36 are deeply engaged within the circular recess 31a of the latch shaft. The same relation between the piston and latch obtains at both ends of the stroke. Fig. 2 shows the valve 64 as a combination check valve and stop cock so that the pressure from the tank 59 can not be dissipated when the pressure in the area S is reduced.

T's 47a and 47b, bushings 48, nipples 49, cocks 50, and pressure gauges 51 are threadedly joined for the obvious purpose of indicating the pressures obtaining within both ends of the cylinder 5. The check valve 118 supplements the check valve at 64.

The device being installed as shown in Figs. 1, 2, 3 and 4 will have the piston and latch in the position shown in Fig. 3, when valve 4 is closed, it being assumed that stop cocks 42 and 64 are still closed to exclude the pressure fluid within the annular cylinder S. This pressure fluid is assumed to be of the value of 320 pounds per square inch, it being understood that all pressures referred to are per square inch. The regulator spring 82 is under such compression that diaphragm 71 will yield and raise valve 72 upon its seat 65c at 300 pounds. Stop cocks 42 and 64 are now opened to admit the pressure to the annular space S.

The grip or freeze, of cups 13 against the cylinder wall is assumed to be overcome by 10 pounds of pressure exerted upon piston and area. The latch is assumed to be set to hold in each direction by a force equal to 10 pounds exerted on the cups. Pressure builds up equally in both ends of the cylinder until its value is 300 pounds. Value 72 then seats, trapping 300 pounds of pressure fluid in the receiver 59 and against the low pressure end of the piston (the left end as shown in Fig. 3). Pressure continues to build up in the high pressure end (the right end in Fig. 3). At 320 pounds in the high pressure end, the 300 pounds on the low pressure end is outbalanced by enough to overcome the assumed cup freeze of 10 pounds plus the latch grip of 10 pounds. The piston, therefore, moves quickly from the closed position of valve 4 shown in Fig. 3 to the open position of the valve shown in Fig. 2.

The pressure fluid at a value of 320 pounds above the oil or other liquid in the annular space S forces the same out of the flow tubing 2 until the pressure fluid becomes depleted down to a value of 280 pounds (20 pounds below the pressure obtaining in the right end of the cylinder). The piston then reverses its travel and closes valve 4. The high and low pressures, therefore, alternately exist in one end of the cylinder and then in the other as the cycle repeats.

As pressure fluid builds up to a predetermined value within the annular space S, the regulator cuts off the entrance of more pressure fluid into the receiver 59 contacting one end of the piston assembly. Pressure contacting the other end of the piston assembly continues to increase within the annular space S until the piston assembly is driven to the left as shown in Fig. 2. This opens the valve 4 and the well flows until the pressure becomes dissipated within the annular space S to a predetermined lesser value than that trapped within the receiver 59 by the check valve of the combination check valve and stop cock 64; whereupon the piston assembly is driven to the right and closes the valve 4 which terminates the flowing operation and completes the operating cycle. Pressure then again builds up within the annular space S until it becomes great enough to overcome the entrapped pressure of lesser value within the receiver 59 as above explained; whereupon the piston assembly is again driven to the left opening the valve 4, and so on.

It is apparent, in the assumed example, that whenever the pressure within the annular space S drops below 300 pounds valve 72 of the regulator will again open; but it will close again when the pressure within the well builds up to 300 pounds and functions as in the first instance.

Receiver 59 should, however, be large enough to contain a volume of pressure fluid many times greater than that employed within the cylinder to actuate the piston in order that the pressure within the receiver will not drop below the opposing pressure in the other end of the cylinder as the pressure fluid in the receiver actuates the piston. If the receiver contains 50 times as much pressure fluid as the piston uses on one stroke, the pressure in the receiver will drop 2% when the piston completes its stroke. The proportion between the volume contained in the receiver and the volume employed in each stroke of the piston being readily variable until it can be made nominal, was not taken into account in the foregoing example.

Spring 82 can, and preferably should be made of such strength that one or two turns of plug 69 will cause a difference of 25 to 50 pounds in the force at which it will allow valve 72 to close. Plug 69, as shown, will allow adjustments over a large range of variation in the pressure required to seat valve 72 if spring 82 is of approximately the stated strength. The pressure at which this valve seats and the adjustment of the latch govern the pressures at which valve 4 will open and close. Springs 32 and 82, therefore, primarily control the operation of this mechanism.

If, in varying the assumed example, it is desired to have a greater difference than 40 pounds between the pressures required to open and close valve 4, such increased difference can be accomplished by increasing the compression force of latch springs 32 of the latch assembly.

It will be understood that, if a well does not produce enough gas to flow it, pressure fluid may be supplied from an outside source by simply changing L 41 to a T and connecting a supply line onto the T. If, when valve 4 is opened, a well will not flow, and pressure fluid of a greater value is not available, aerating devices such as disclosed in my Patents Nos. 1,470,053, 1,517,611, 1,686,262, 1,712,418, 1,747,570, 1,747,571, 1,747,572, 1,749,124, 1,767,201, 1,767,202, 1,768,109, 1,770,023, 1,772,036, 1,773,942, 1,773,943, 1,779,726, 1,779,727, 1,784,720, 1,793,671, or 1,952,581 may be used in combination with this automatic valve operating means to cause a well to flow at much less pressure than would be otherwise required. The combination of this invention, with such means for lowering the pressure at which wells will flow, constitutes one of the most valuable uses of the invention.

The lower the pressures used, the lower will be the resulting difference between the high and low pressures on account of the diminishing freeze of the cups. This fact coordinates with the desirability of small differentials when low pressures are employed.

If, by way of illustrating other uses of this invention, it is desired for example, to maintain a slight variable predetermined pressure in a pipe line or other receptacle by augmenting the supply of pressure fluid discharged into it from any source, this mechanism, minus the regulator, may be installed to operate a valve between the source of supply and the receptacle. In such installation the cylinder end connections will be reversed and receiver 59 will be closed at its lower end where nipple 60 is shown connected in Fig. 4, and filled with pressure fluid at a value midway between the high and low pressures to be maintained in the pipe line or other receptacle.

In such installation it will be necessary to reverse the cylinder end connections from their positions shown in Figs. 1 and 2; because, when installed in a pipe line, the valve 4 must close by pressure from the pipe line; whereas, this valve would open by pressure from the well, as shown in Figs. 1 and 2. The operation will otherwise be the same as hereinbefore described. Many other forms of installation to serve many other purposes will become apparent in accomplishing any of the first mentioned, and other objects.

The equally preferred form of this invention shown in Figs. 8, 9 and 10 employs a rack and pinion as a means of actuating the valve 104, this valve being operated by movement in a plane at right angle to the movement employed to operate the valve 4 of the preceding form of the invention. Another difference in the two constructions is that the first form is limited to valves that open and close by less than 180° rotation of the actuating arm or shaft; whereas, the second form is not limited to such, so called, quick opening valves, but may be applied to valves that require more than 180° rotation of the actuating means to operate them, it being possible to impart one or more complete revolutions to the valve opening and closing member.

Rack 86, having teeth 86a engaging with mating teeth 89a of pinion 89, is firmly secured upon boss 12g (Figs. 17 and 19) by bolts 87. Rack spacer lugs 88, freely slidable within slot 78b of center section 78, serve to space the rack apart from, but immediately adjacent to, section 78. Washers 88' serve to firmly engage the heads of bolts 87. It will be noted that spacer lugs 88 and washers 88' have rib, or tongue shaped, extensions fitting slidably within the slots 86d of the rack in order to aid bolts 87 to hold the rack in true and firm alignment with section 78 and the piston 12 as appears in Figs. 16, 17 and 19.

Slots 86d, in plate section 86b, are open at either end beyond the lugs 88 and washers 88' in order that slight longitudinal adjustments may be made in the position of the rack. Opening 86e serves the same purpose and also provides that the heads of bolts 87 may be reached with a wrench. The opening 86c, in plate section 86b, is somewhat larger than the bolt heads for convenience of assembly.

Figures 15, 16, 17, 19, 20, 20A, 22:
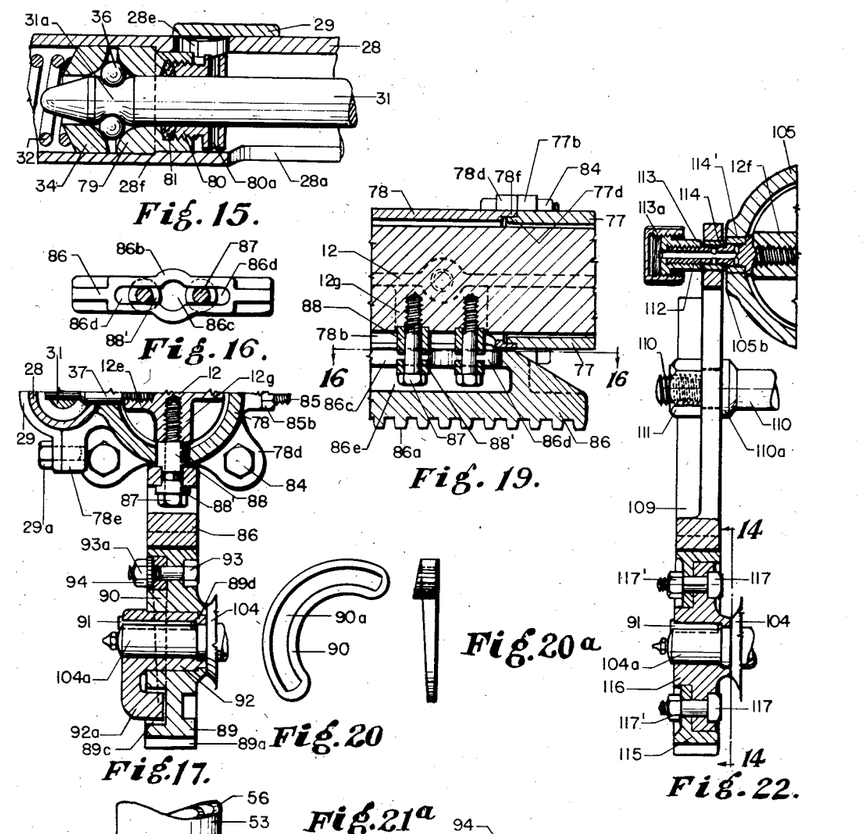
Fig. 15 is mainly an enlarged longitudinal section of a portion of the latch assembly.
Fig. 16 is a longitudinal section on the line 16—16, Figs. 9 and 19.
Fig. 17 is a partial transverse section on the line 17—17, Fig. 9.
Fig. 19 is a partial longitudinal section on the line 19—19, Fig. 10.
Figs. 20 and 20A are front and end elevations respectively of the bumper in Fig. 9.
Fig. 22 is a partial transverse section on the line 22—22, Fig. 12.

Within a central circular opening through the pinion 89, is rotatably fitted valve stem driver 92, rigidly secured upon valve stem 104a by key 91. Valve 104, having slight clearance with pinion 89, causes the flange 89d, rotatably engaged with a mating shoulder upon valve stem driver 92, to hold these parts in assembled relation as shown in Fig. 17. Valve stem driver 92 has an arm 92a freely rotatable within a trough 89c of the pinion 89. A knob 89b stops the rotation of the arm 92a in one direction, and the bumper 90 limits the travel of this arm in the other direction. The bumper 90 is slidable within the trough 89c until it is locked within the trough by bolts 93, having nut 93a engaged upon washers 94 formed with sloping heads and arcuate tongues mating with the sloping outer surface of bumper 90 and the arcuate opening 90a therein respectively. The bumper 90 is locked by the means stated in such position that the arm 92a will idle between it and the bumper knob 89b. At the end of this idle travel, the pinion 89 and valve stem driver 92 become locked together and rotate in unison during the remainder of the pinion travel.

The piston travel being constant, the rack travel is, of course, constant. This constant travel of the rack would cause a constant factor of rotation in the pinion 89 except for the variable idling movement between the driver 92 and the pinion. It will be observed in Fig. 9 that the bumper 90 is set to allow the maximum idle rotation of arm 92a, resulting in the minimum rotation of valve stem 104a, such adjustment being proper for a new valve.

As the valve wears in use, its travel will increase. To compensate for such wear, the bumper 90 is moved clockwise from time to time as may be necessary to provide the proper amount of rotation to open and close the valve 104. It will also be noted that bumper knob 89b may be cast integral with the pinion, all adjustment of the idling movement of arm 92a being, therefore, in the opposite direction. Such one way adjustment of the idling movement is usually proper because the valve wear is almost entirely in the direction of its seat, this direction being clockwise in all manufactured valves known to the applicant. Another bumper such as shown at 90 can, however, be readily installed in place of the fixed knob 89b if it should be desired to provide adjustable valve travel in both directions.

The adjustable idling movement of the valve stem driver arm 92a serves not only to provide proper stroke for any valve, but this idling movement gives the piston a running start to assist in performing its work. Until the arm 92a strikes the bumper 90 or the knob 89b, the piston travel is free and the piston acquires considerable momentum, the force of which is greater than the piston would have if the start were burdened with the work load. Smaller difference between the value of the high and lower pressures of the pressure fluid used to operate the piston may, therefore, be attained with this modification of the invention than can be had with the first form.

Figs. 8, 9 and 10 show that each of the cylinders 77 and 77' are made in one piece without end plugs, as shown in the first form, and are secured upon the center section 78 by bolts 84 engaging with flanged extensions 77b and 78d. The turned down ends 77d of the cylinders fit snugly within the tubular shell ends 78f of the center section, which also has latch housing 40 clamp bases 78e corresponding to the similar clamp bases 5f in Fig. 1.

It will be understood that the pistons 12 and cups 13 have a close working fit within the cylinders, as in the first form of the invention.

The two parts 15A, in addition to serving to lock the cups in place, as shown in Fig. 8, each has a slightly tapered extension 15Aa which serves as a piston to engage the openings 77c of the dashpot cylinder 77a for the obvious purpose of preventing piston slam at each end of the piston travel.

The clamps 83, engaging upon the nipple 2b' and secured by bolts 11 and nuts 11a, receive through their lower extensions the cylinder support bolts 85 which are threadedly engaged within the bosses 78a of the center section 78 and locked by nuts 85b. Bolts 85 being threaded the entire length, provide that nuts 85a may be used to secure the bolts upon different sizes of tubing as is apparent. The clamps 83 are likewise designed to engage different sizes of ordinarily used well tubing.

The latch in Figs. 8 and 15, while identical in purpose and operation to the latch shown in Fig. 3, is slightly changed as follows: the ball floor 79 has an elongation which receives packing 81 and gland 80, having peripheral holes 80a adapted to be engaged by a nail or rod inserted through openings 28e in latch housing 28 for the purpose of adjusting the gland. This gland serves to prevent the escape of the lubricant from the latch assembly more effectively than to rely wholly upon the slight clearance between the latch shaft and the ball floor to prevent such escape as was done in Fig. 3. The latch assembly is on the opposite side of the cylinder from the similar latch assembly shown in Fig. 3 which accounts for boss 12e being 180° around from the similar boss 12e in Figs. 3 and 4, this change in position of the boss being accomplished by merely rotating the piston. The slot 78c, in the center section 78 (Fig. 8), is on the opposite side from the similar slot 5d in the cylinder 5 (Fig. 3).

The cylinder 77 (Fig. 9), otherwise the same as cylinder 77', has ribs 77f upon which counter bracket 95 is secured by cap screws 27 (Figs. 9 and 18). The bracket has arm brackets 95a through which pawl rod 97 has a free sliding fit. The pawl rod has a head 97a engaging upon a coiled spring 100 which has a free working fit over the rod. The spring urges the head 97a to engage the end of rack 86 at such point in its travel as will cause the pawl 102 to turn the counter ratchet wheel 96 one tooth at each stroke of the rack. The travel spacer nut 98 having extension 98a is locked upon the rod 97 by nut 99. The extension 98a, having an internal bore of somewhat greater diameter than the diameter of the rod, serves to house threads on the rod inward of the nut and to land upon the adjacent bracket 95a to provide that the pawl will engage another of the teeth 21c each time the rack recedes. Pawl carrier 101 lands upon a shoulder 97b on rod 97 against which it is locked by a nut as shown in Fig. 9. The rib 95b serves to guide the pawl carrier, the upper end of which engages it on either side, and is freely movable upon it. The pawl, hinged upon the pawl carrier by pin 103, has its center of gravity well forward so that it will normally assume the position shown in Fig. 9. A heel of the pawl engages the carrier 101 to prevent the pawl from yielding when it engages the counter teeth on its forward stroke. In recession of rod 97 the pawl will swing forward and drag over the counter teeth as is apparent, the counter ratchet wheel 96 being held against anti-clockwise rotation by teeth 21b and 22c as was shown and explained in connection with the first form of the invention. Counter bracket extension 95c (Figs. 9 and 18) has a pointer 95d which indicates the number of the last completed flowing operation. Other parts of the counter mechanism are the same as shown in Figs. 2, 4 and 7.

It will be understood that the mechanism shown in Figs. 8, 9 and 10 is to be installed in the same manner as was described for the first form of the invention, and that the operation is likewise the same.

Figure 12:
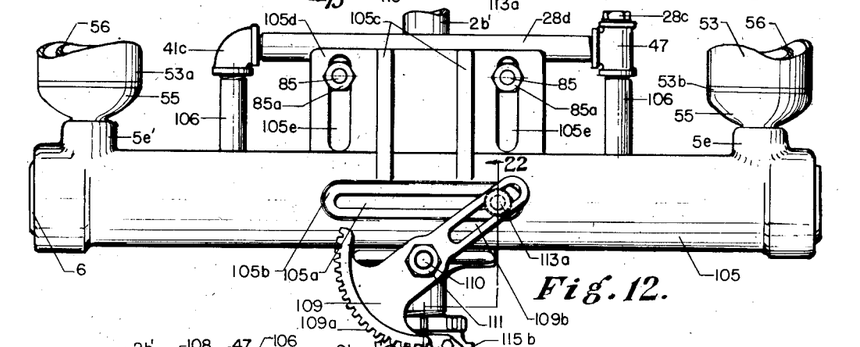
Fig. 12 is a front elevation of this second modified form of the invention.
Figure 13:
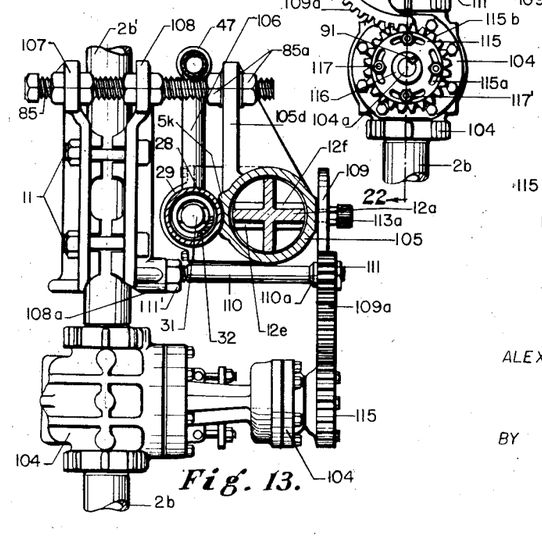
Fig. 13 is a transverse section on the line 13—13, Fig. 11.

The second modification of the invention is shown in Figs. 11, 12 and 13.

Clamps 107 and 108, by means of bolts 11, secure the device upon nipple 2b' in such position vertically as to engage the teeth 109a of the gear segment 109 with the mating teeth of pinion gear 115. Horizontally, these members are adjusted to engage their teeth by moving the nuts 85a inward or outward upon bolts 85, the nuts engaging upon bracket 105d, supported by ribs 105c of the cylinder 105.

Figure 14:
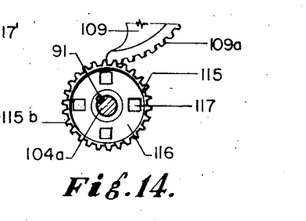
Fig. 14 is a section on the line 14—14, Fig. 22.

The valve stem 104a has the pinion base plate 116 snugly fitted over it and secured in place by key 91 (Figs. 12 and 14). Bolts 117 and nuts 117' secure this plate within pinion gear 115 having peripheral teeth 115b adapted for mated engagement with teeth 109a of the gear segment, as appears in Figs. 12 and 22. The shaft stud 110 is threadedly connected into boss 108a of clamp 108 (Fig. 13) and locked in place by nut 111'.

This stud acts as a pivot means supporting the gear segment 109 axial thereof. The shoulder 110a and nut 111 which locks upon another shoulder have between them slight clearance with the slotted arm of gear segment member 109. The slot 109b, having free clearance over roller 114, is of such length as to accommodate full stroke of the piston in all positions of bolts 85 within slots 105e as will later be further explained.

The gear is actuated by the piston 12 within cylinder 105. Within the boss 12f (Fig. 22) drive stud 112 has threaded engagement, a portion extending outward of the cylinder through slot 105a having the flat surface 105b adjacent to the slotted arm of the member 109. The roller 114' has free rotatable engagement over stud 112 and is free within the slot 105a. The roller 114 is also free to rotate upon stud 110 and is movable within slot 109b as stated. A lock nut 113 holds both rollers in position as shown in Fig. 22. A grease cap 113a, threaded over the lock nut 113, is adapted to force a lubricant under rollers 114 and 114' as shown. Slot 105a has a flat ribbed surface 105b, which serves as a track for roller 114'.

The slots 105e and 115a relate to adjustments. As in both preceding forms of the invention, the piston travel is constant. Some valves, as stated, require more rotation of their stems than others to operate them. Raising the cylinder 105 by moving it upward in slots 105a will lessen the rotation of gear segment 109 and valve stem 104a, and vice versa. Slots 115a provide that the teeth 109a and 115b may be engaged in any exact position of the operating mechanism of valve 104.

Within the cylinder 105, Fig. 11, it will be seen that a dashpot is provided at either end of the piston travel by inward extension 7Aa of plug 7A engaging within dashpot cylinder 77'c of cup clamp 15B.

The nipples 106 of the latch assembly in Fig. 12 correspond in purpose to nipples 28b in Fig. 9, but are somewhat longer in order that they will clear bolts 85 in their upper position within slots 105e.

The installation and operation of the first and second modified forms of the invention are substantially the same as described for the first form except for the unimportant fact that the second modification employs no counter mechanism for recording the sequence of operations, such mechanism being obviously in the nature of an attachment.

It will be understood that the foregoing drawings and specification are illustrative and are not intended to limit the construction or uses of this invention which may be greatly varied within the scope and purpose thereof.

I claim:

1. A flow control for wells having a casing and tubing, a valve to control the discharge of produced fluid from said tubing, means to control the operation of said valve including a differential pressure actuated mechanism, said means including a cylinder, a piston device therein, a connection to a source of fluid under pressure to admit such pressure to one end of said cylinder to open said valve, and a connection to a source of fluid under a lower pressure to admit such lower pressure to said cylinder to close said valve when the higher pressure of said first source has been dissipated in producing a fluid flow through said tubing, and a latch to first delay and then to quicken the movement of said piston device.

2. A flow control for wells having a casing and tubing, a valve to control the discharge of produced fluid from said tubing, means to control the operation of said valve including a differential pressure actuated mechanism, said means including a cylinder, a piston device therein, a connection to a source of fluid under pressure to admit such pressure to one end of said cylinder to open said valve, and a connection to a source of fluid under a lower pressure to admit such lower pressure to said cylinder to close said valve when the higher pressure of said first source has been dissipated in producing a fluid flow through said tubing, said lower pressure source including a reservoir and a pressure regulator valve thereon to admit fluid pressure from the higher pressure source thereto.

3. A flow control for wells having a casing and tubing, a valve to control the discharge of produced fluid from said tubing, means to control the operation of said valve including a differential pressure actuated mechanism, said means including a cylinder, a piston device therein, a connection to a source of fluid under pressure to admit such pressure to one end of said cylinder to open said valve, and a connection to a source of fluid under a lower pressure to admit such lower pressure to said cylinder to close said valve when the higher pressure of said first source has been dissipated in producing a fluid flow through said tubing, said lower pressure source including a reservoir and a pressure regulator valve thereon to admit fluid pressure from the higher pressure source thereto, said regulator valve being adjustable.

4. A flow control for wells having a casing and tubing, a valve to control the discharge of produced fluid from said tubing, means to control the operation of said valve including a differential pressure actuated mechanism, said means including a cylinder, a piston device therein, a connection to a source of fluid under pressure to admit such pressure to one end of said cylinder to open said valve, and a connection to a source of fluid under a lower pressure to admit such lower pressure to said cylinder to close said valve when the higher pressure of said first source has been dissipated in producing a fluid flow through said tubing, and latch means for said piston device to cause it to remain in position to hold said valve either open or closed.

5. In a flow intermitter for wells, a casing, a tubing therein, said tubing extending beyond said casing; sealing means between said casing and tubing, an annular space between said casing and tubing, pressure fluid in said space including means for supplying same thereto from an outside source, a valve in said tubing to control the discharge of well fluid therethrough, means to control the operation of said valve including a differentially pressure actuated mechanism, said means including a cylinder and a piston assembly therein; a lubricator shell upon each end of said cylinder and having communication with the ends of said piston assembly, a lubricant in said shells to lubricate said cylinder and assembly, a baffle means within each of said shells, a conduit for pressure fluid communicating between said space and the upper end of one of said lubricator shells to force said assembly in one direction to open said valve and permit fluid from said casing to flow therethrough, a second conduit communicating between the upper end of the other of said lubricator shells and a receiver containing pressure fluid of a lower value to force said piston in the opposite direction and close said valve when said fluid in the first of said shells has its pressure reduced below the pressure of the fluid within said receiver due to depletion through said tubing of the pressure fluid force within said space, a conduit communicating between said receiver and said annular space, said conduit having a valve, a check valve, and a pressure regulator, said check valve opening toward said receiver; an arm secured upon said valve, a pin secured upon said piston assembly, said pin being adapted to actuate said arm to open said valve when said assembly moves in one direction and to close said valve when said assembly moves in the opposite direction; a latch controlling the movements of said assembly, said latch being adapted to first retard the movements of said assembly in each direction and then to quicken such movements in the other direction; means for lubricating said latch and to prevent the same from becoming impinged upon said means, and a mechanical counter operated by said assembly to numerically record the operations of said first valve.

6. In a flow intermitter for wells, a casing having well fluid therein, tubing in said casing, said tubing extending beyond same, sealing means between said casing and tubing, an annular space between said casing and tubing, pressure fluid in said space including means for supplying same thereto from an outside source, a valve in said tubing to control the discharge of well fluid therethrough, means to control the operation of said valve including a differentially pressure actuated mechanism, said means including a cylinder and a piston assembly therein; a lubricator shell upon each end of said cylinder and having communication with the ends of said piston assembly, a lubricant in said shells to lubricate said cylinder and assembly, a conduit between said annular space and one end of said cylinder for pressure fluid to force said assembly in one direction to open said valve and allow fluid to flow therethrough from said casing, a second conduit communicating between the other end of said cylinder and a receiver containing pressure fluid of a lower value to force said assembly in the opposite direction when said fluid in the first end of said cylinder and in said space has its pressure reduced below the pressure within said receiver due to dissipation of such fluid through said tubing, a conduit communicating between said receiver and said annular space, a check valve and a pressure regulator in said conduit, said check valve opening toward said receiver; a rack secured upon said piston assembly, said rack being engageable with a pinion to operate said first valve; a latch controlling the movements of said assembly, said latch being adapted to first retard the movements of said assembly in each direction and then to quicken such movements in the opposite direction; and means for lubricating said latch and to prevent the same from becoming impinged upon said means.

7. A flow intermitter for wells comprising the combination of a casing having well fluid therein, tubing in said casing, said tubing extending beyond same; sealing means between said casing and tubing, an annular space between said casing and tubing, pressure fluid in said space including means for supplying same thereto from an outside source, a valve in said tubing to control the discharge of well fluid therethrough, means to control the operation of said valve including a differentially pressure actuated mechanism, said means including a cylinder and a piston assembly therein; a conduit between said annular space and one end of said cylinder for pressure fluid to force said piston in one direction to open said valve and allow fluid to flow therethrough from said casing, a second conduit communicating between the other end of said cylinder and a receiver containing pressure fluid of a lower value to force said assembly in the opposite direction when said fluid in the first end of said cylinder and in said space has its pressure reduced below the pressure within said receiver due to dissipation of such fluid through said tubing, a conduit communicating between said receiver and said annular space, a valve in said conduit, said valve being adapted to confine pressure fluid in said receiver; a pin secured upon said piston assembly, said pin being adapted to actuate a gear segment to operate said valve through a pinion secured upon the operating means of said valves; a latch controlling the movements of said assembly, said latch being adapted to first retard the movements of said assembly in each direction and then to quicken such movement in the opposite direction; means for lubricating said latch, means to prevent same from becoming impinged upon said means, and means for adjusting said latch.

8. Intermitter means for wells including in combination a casing having well fluid therein, tubing in said casing, said tubing extending beyond same; sealing means between said casing and tubing, an annular space between said casing and tubing, pressure fluid in said space including means for supplying same thereto from an outside source, a valve in said tubing to control the discharge of well fluid therethrough, means to control the operation of said valve including a differentially pressure actuated mechanism, said means including a cylinder and a piston assembly therein; a conduit between said space and one end of said cylinder for pressure fluid to force said piston in one direction to open said valve and allow fluid to flow therethrough from said casing, a second conduit communicating between the other end of said cylinder and a receiver containing pressure fluid of a lower value to force said assembly in the opposite direction when said fluid in the first end of said cylinder and in said space has its pressure reduced below the pressure within said receiver due to dissipation of such fluid through said tubing, a conduit communicating between said receiver and said space, a check valve and a pressure regulator in said conduit, said check valve opening toward said receiver; and means on said assembly coacting with means on said valve to control the opening and closing movements of said valve.

9. Intermitter means for wells comprising in combination a casing having well fluid therein, pressure fluid in said casing, a valve in said casing, means to control the operation of said valve including a differentially pressure actuated mechanism, said means including a cylinder and a piston assembly therein; a conduit between said casing and one end of said cylinder for pressure fluid to force said piston in one direction to open said valve and allow fluid to flow therethrough from said casing, a second conduit communicating between the other end of said cylinder and a receiver containing pressure fluid of a lower value to force said assembly in the opposite direction when said fluid in the first end of said cylinder and in said casing has its pressure reduced below the pressure within said receiver due to dissipation of such fluid through said casing, a check valve and a pressure regulator in said conduit, said check valve opening toward said receiver; means on said assembly coacting with means on said valve to control the opening and closing of said valve, a latch controlling the movements of said assembly, said latch being adapted to first retard the movements of said assembly in each direction and then to quicken the same in the opposite direction; and means for lubricating said latch and to prevent the same from becoming impinged upon said means.

10. In a surface intermitter for cased wells having eduction means, the combination of a cylinder having a piston slidable therein, said cylinder being in spaced relation to said eduction means; a valve in said means, means operable by said piston to open said valve at a predetermined value of fluctuating pressure fluid in one end of said cylinder and to close said valve by non-fluctuating pressure fluid in the other end thereof when the pressure in said first end depletes to a predetermined less value than the pressure within the second end, means for admitting pressure fluid into both ends of said cylinder, a reservoir having a lubricant therein being interposed between each end of said piston and said pressure fluid, said lubricant being adapted to follow said piston responsive to the force of said fluid to lubricate said cylinder and piston; and a latch assembly upon said cylinder to first delay and then to quicken the movements of said piston and valve.

11. In a surface intermitter for cased wells, means for maintaining a constant pressure within a reservoir supplied from a pressure fluid source of fluctuating value, said means including a receiver, a pressure regulator, a check valve, and a source of pressure fluid, said check valve opening toward said receiver, and said regulator being between such source and said receiver and intaking from said source.

12. A pressure regulator for well intermitters consisting of a shell having inlet and outlet connections to a passage therethrough, a partition transverse of said shell, a valve seat surrounding an axial opening through said partition, said opening communicating between said inlet and outlet openings and said seat being upon the inlet side of said opening; a spring housing secured to said shell and hermetically securing a diaphragm thereupon, a valve having a stem secured to said diaphragm, said valve being in spaced relation to said seat; a second partition in said shell, said partition having an opening axial of said shell to guide the stem of said valve and having clearance with said stem to allow pressure fluid from said passage to contact said diaphragm; a plug closing an opening in the valve end of said shell, a spring in said housing urging said diaphragm toward said valve and controlling the spaced relation between said valve and seat, and an adjusting plug in the end of said housing remote from said diaphragm, said plug having an opening therethrough to vent pressure fluid if same should leak past said diaphragm, said plug being adapted to regulate the compression of said spring to control the pressure fluid force acting upon said diaphragm to seat said valve.

13. A pressure regulator for well intermitters including a shell, inlet and outlet connections to a passage therethrough, a partition transverse of said shell, a valve seat surrounding an axial opening through said partition, said opening communicating between said inlet and outlet openings and said seat being upon the inlet side of said opening; a spring housing secured to said shell and hermetically securing a diaphragm thereupon, a valve having a stem secured to said diaphragm, said valve being in spaced relation to said seat; a second partition in said shell, said partition having one opening axial of said shell to guide the stem of said valve and another opening to allow pressure fluid from said passage to contract said diaphragm; a plug closing an opening in the valve end of said shell, a spring in said housing urging said diaphragm toward said valve and controlling the spaced relation between said valve and seat, and an adjusting plug in the end of said housing remote from said diaphragm, said plug having an opening therethrough to vent pressure fluid leaking past said diaphragm, said plug being adapted to regulate the compression of said spring to control the pressure fluid force acting upon said diaphragm to seat said valve.

14. In an intermitter for wells, a pinion for operating a valve therein having an actuating stem, means to drive said pinion, said pinion being adapted to transmit to said stem only a portion of the movement of said first means, said pinion having teeth enmeshed with said driving means and adapted to allow limited rotary movement of said first means, stop means on said pinion, said stop means being adjustable to limit rotation of said first means relative to said pinion so that the rotation together of said pinion and first means will be such as to completely open and close said valve.

ALEXANDER BOYNTON.